(12) United States Patent
Zhan et al.

(10) Patent No.: US 12,447,677 B2
(45) Date of Patent: Oct. 21, 2025

(54) RAPID PROTOTYPING DEVICE

(71) Applicant: Shenzhen Anycubic Technology Co., Ltd., Shenzhen (CN)

(72) Inventors: Xiaolin Zhan, Shenzhen (CN); Xinqiao Deng, Shenzhen (CN); Huazhong Wei, Shenzhen (CN)

(73) Assignee: Shenzhen Anycubic Technology Co., Ltd., Shenzhen (CN)

( * ) Notice: Subject to any disclaimer, the term of this patent is extended or adjusted under 35 U.S.C. 154(b) by 284 days.

(21) Appl. No.: 18/226,263

(22) Filed: Jul. 26, 2023

(65) Prior Publication Data

US 2024/0217176 A1 Jul. 4, 2024

Related U.S. Application Data

(63) Continuation of application No. PCT/CN2023/074943, filed on Feb. 8, 2023.

(30) Foreign Application Priority Data

Dec. 28, 2022 (CN) .......................... 202211695393.3

(51) Int. Cl.
*B29C 64/245* (2017.01)
*B29C 64/124* (2017.01)
*B29C 64/232* (2017.01)
*B29C 64/236* (2017.01)
*B29C 64/393* (2017.01)
*B33Y 30/00* (2015.01)
*B33Y 50/02* (2015.01)

(52) U.S. Cl.
CPC .......... *B29C 64/245* (2017.08); *B29C 64/124* (2017.08); *B29C 64/232* (2017.08); *B29C 64/236* (2017.08); *B29C 64/393* (2017.08); *B33Y 30/00* (2014.12); *B33Y 50/02* (2014.12)

(58) Field of Classification Search
None
See application file for complete search history.

(56) References Cited

U.S. PATENT DOCUMENTS

| 9,346,218 B2* | 5/2016 | Chen ................. B29C 64/255 |
| 2014/0085620 A1* | 3/2014 | Lobovsky ............ B29C 64/245 355/72 |
| 2019/0381730 A1* | 12/2019 | Lu ..................... B29C 64/232 |

FOREIGN PATENT DOCUMENTS

| CN | 209478957 U | 10/2019 | |
| CN | 113134972 A | 7/2021 | |
| CN | 113199747 A * | 8/2021 | ........... B29C 64/393 |

(Continued)

*Primary Examiner* — Yung-Sheng M Tsui
(74) *Attorney, Agent, or Firm* — Bayramoglu Law Offices

(57) ABSTRACT

A rapid prototyping device is provided. The rapid prototyping device includes a frame with a substrate. A printing platform is slidably connected to the frame. A moving assembly includes a display screen assembly corresponding to the printing platform. The moving assembly cooperates with the substrate to move to a leveling position relative to the substrate under the pushing of the printing platform. A suspension member is configured to apply a pushing force, which enables the moving assembly to move away from the substrate, to the moving assembly. The positioning assembly is configured to position the moving assembly in the leveling position. The rapid prototyping device is applied to level the rapid prototyping device.

14 Claims, 7 Drawing Sheets

(56) References Cited

FOREIGN PATENT DOCUMENTS

| | | |
|---|---|---|
| CN | 215095647 U | 12/2021 |
| CN | 115042432 A | 9/2022 |
| CN | 217862803 U | 11/2022 |
| WO | 2022100461 A1 | 5/2022 |

* cited by examiner

RAPID PROTOTYPING DEVICE

CROSS REFERENCE TO THE RELATED APPLICATIONS

The present application is a continuation application of PCT International Application No. PCT/CN2023/074943, filed on Feb. 8, 2023, which is based upon and claims priority to Chinese Patent Applications No. 202211695393.3, filed on Dec. 28, 2022, the entire contents of which are incorporated herein by reference.

TECHNICAL FIELD

The present invention relates to the field of stereo-lithography, and in particular to a rapid prototyping device.

BACKGROUND

A photocuring rapid prototyping device takes advantage of a characteristic of a photosensitive resin in a fluid state undergoing a polymerization reaction under light, to allow a light source to perform irradiation according to the shape of a cross section of an object to be formed, so that the resin in the fluid state is cured and formed. A printing platform and the light source are respectively located at two sides of a resin vat, the photosensitive resin is contained in the resin vat, the printing platform is immersed in the resin and maintains a uniform gap with a release film at the bottom of the resin vat, and light is projected onto the photosensitive resin through the release film, so that the photosensitive resin between a forming surface of the printing platform and the release film is cured and formed according to a preset contour, the printing platform then moves upward, a forming model is separated from the release film and attached to the forming surface of the printing platform, and moves upward with the printing platform, the photosensitive resin will re-flow into a space between the forming model and the release film, and stereo-lithography can be achieved by performing the next layer of printing and layer-by-layer superposition.

The forming quality of the first layer of the model has a decisive influence on printing success and the quality of the whole forming model. The first layer of the model has a forming requirement that the forming surface of the printing platform is parallel to the release film by an accurate distance. However, due to an assembly error of the rapid prototyping device or a mechanical error generated during use, the distance between the forming surface of the printing platform and the release film will be changed, the thickness of the first layer of the model will be not uniform, the model cannot be uniformly and firmly adhered to the printing platform, causing poor stability of the model during printing, and the model will tilt, resulting in a printing failure.

An existing leveling method mainly levels the printing platform to ensure that the forming surface of the printing platform is parallel to a light transmission screen. For example, the patent with publication No. CN 209478957 U discloses an automatic rapid prototyping device for a photocuring 3D printer, a ball head is connected to a printing plane by means of a short shaft, the ball head is embedded into a sleeve below a gimbal and is in contact with a spring, when the printing platform moves to the lowermost end, the spring in the sleeve allows the printing plane to be completely in contact with an LCD screen of the photocuring 3D printer, and a screw motor tightens and compresses the sleeve so that the sleeve fixes the ball head to achieve leveling. By adjusting the printing platform for leveling, since the printing platform and a lifting frame structure are movably connected and the connection is unstable, the printing platform is likely to loosen during printing and to cause position displacement of the printing platform due to an external force.

SUMMARY

In view of the foregoing, the present invention provides a rapid prototyping device, mainly in order to solve the problem that leveling by adjusting a printing platform results in the instability of the printing platform.

In order to achieve the above objective, the present invention mainly provides the following technical solutions:

The present invention provides a rapid prototyping device, including: a frame, a printing platform, a moving assembly, a suspension member, and at least one positioning assembly. The frame includes a substrate. The printing platform is slidably connected to the frame. The moving assembly includes a display screen assembly, wherein the display screen assembly corresponds to the printing platform, and the moving assembly cooperates with the substrate to move to a leveling position relative to the substrate under the pushing of the printing platform. The suspension member is in direct or indirect contact with the moving assembly, and the suspension member is configured to apply a pushing force, which enables the moving assembly to move away from the substrate, to the moving assembly. The positioning assembly is configured to position the moving assembly in the leveling position.

The rapid prototyping device according to the present invention mainly performs leveling in such a manner that the printing platform pushes the moving assembly to move relative to the substrate, and positions the moving assembly in the leveling position by means of the positioning assemblies, so as to avoid an unstable connection of the printing platform caused by the leveling of the printing platform. In the prior art, a leveling method is mainly used for leveling the printing platform so as to ensure that a forming surface of the printing platform is parallel to a light transmission screen. Since the printing platform and a lifting frame structure are movably connected and the connection is unstable, the printing platform is likely to loosen during printing and to cause position displacement of the printing platform due to an external force. Compared with the prior art, in the present application, the moving assembly is configured to place a resin vat thereon, the plurality of positioning assemblies are arranged between the moving assembly and the substrate, and the moving assembly is pushed to move relative to the substrate by the printing platform and is positioned by the plurality of positioning assemblies, so that an inclination angle and height of the moving assembly can be adjusted, and the parallelism between the release film of the resin vat and the printing platform can then be adjusted to ensure thickness uniformness of a first layer of a printing model and accurate forming of the model.

DETAILED DESCRIPTION OF THE EMBODIMENTS

Figure 1:
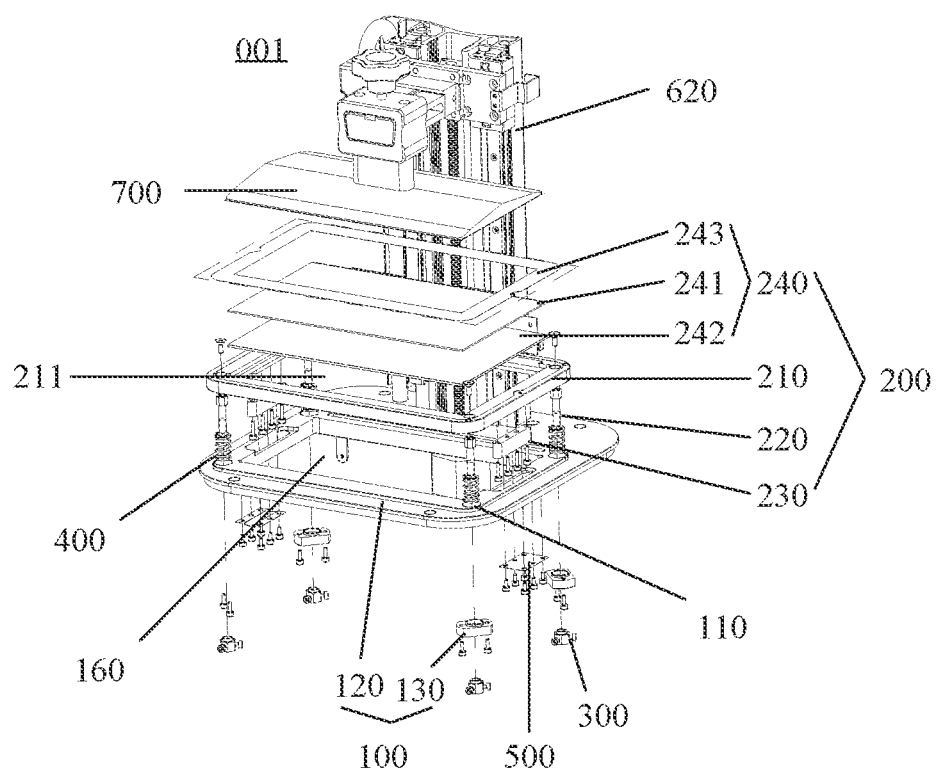
FIG. 1 is a schematic exploded view of a first partial structure of a rapid prototyping device according to an embodiment of the present invention at a first perspective.
Figure 2:
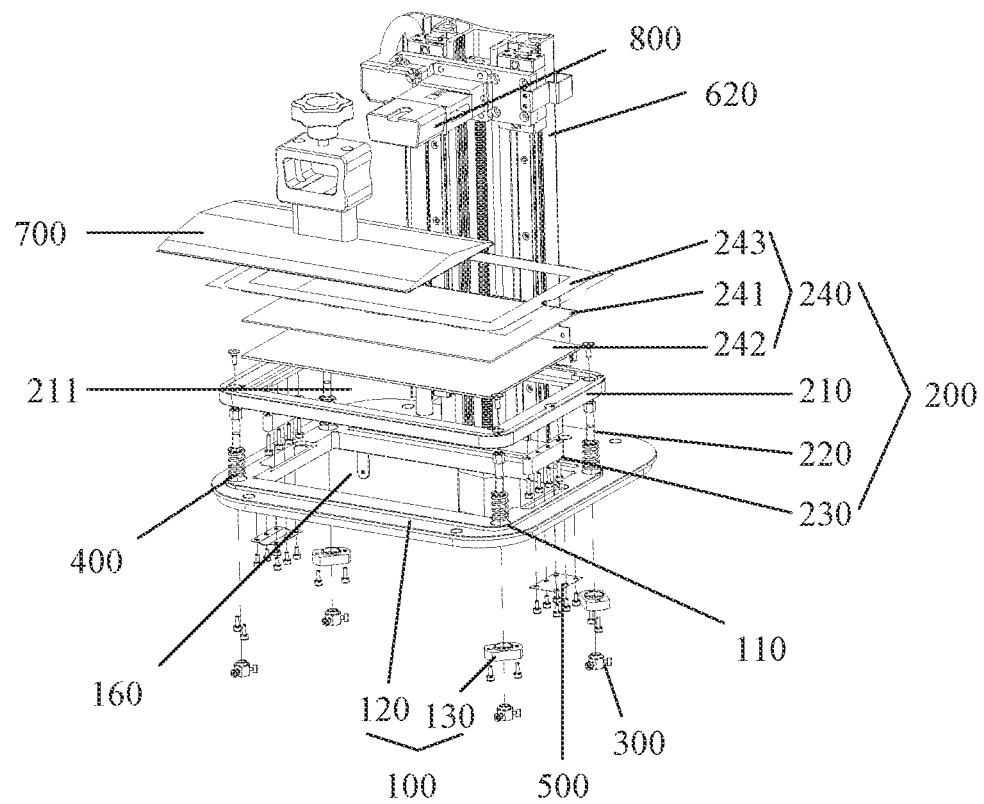
FIG. 2 is a schematic exploded view of a second partial structure of a rapid prototyping device according to an embodiment of the present invention at a first perspective.

In order to further illustrate the technical means used to achieve an intended purpose of the present invention and the technical effects of the present invention, specific embodiments, the structure, features and effects of a rapid prototyping device 001 according to the present invention are described in detail below in conjunction with the accompanying drawings and preferred embodiments.

In an aspect, as shown in FIGS. 1-12, the embodiments of the present invention provide a rapid prototyping device 001, including: a frame 600, a printing platform 700, a moving assembly 200, a suspension member 400, and at least one positioning assembly 300. The frame 600 includes a substrate 100. The printing platform 700 is slidably connected to the frame 600. The moving assembly 200 includes a display screen assembly 240, wherein the display screen assembly 240 corresponds to the printing platform 700, and the moving assembly 200 cooperates with the substrate 100 to move to a leveling position relative to the substrate 100 under the pushing of the printing platform 700. The suspension member 400 is in direct or indirect contact with the moving assembly 200, and the suspension member 400 is configured to apply a pushing force, which enables the moving assembly 200 to move away from the substrate 100, to the moving assembly 200. The positioning assembly 300 is configured to position the moving assembly 200 in the leveling position.

The frame 600 is a fixed main body of the rapid prototyping device 001, the moving assembly 200 is configured to place a resin vat 900 thereon, and a release film of the resin vat 900 is configured to be attached to an upper surface of the display screen assembly 240; before the resin vat 900 is placed, the printing platform 700 pushes the moving assembly 200 to move relative to the substrate 100, and relative positions of the moving assembly 200 and the substrate 100 can be changed by changing different distances by which different sides of the moving assembly 200 move relative to the substrate 100, including changing an inclination angle and a height of the moving assembly 200, so that the resin vat 900 is placed on the moving assembly 200, and a plane where the release film is located is parallel to a forming surface of the printing platform 700 for fixing a model, achieving leveling.

Moving the moving assembly 200 relative to the substrate 100 is achieved by means of the pushing by the printing platform 700 and application of an external force. The moving assembly 200 is pushed by the printing platform 700, so that a surface of the moving assembly 200 is in contact with the forming surface of the printing platform 700, the contact surfaces are completely fitted, and leveling is then achieved by means of the printing platform 700, thereby ensuring that the surface of the moving assembly 200 is parallel to the forming surface of the printing platform 700 during printing. Alternatively, rough adjustment of the levelness of the moving assembly 200 may also be performed visually by manually pushing the moving assembly 200, and fine adjustment may then be performed by pushing the moving assembly 200 by the printing platform 700, making the leveling process faster.

The moving assembly 200 is configured to place the resin vat 900 thereon, the moving assembly 200 is configured to project light of a fixed contour onto the resin vat 900, and the light passes through the release film so that a resin in the resin vat 900 is cured with the fixed contour. The substrate 100 and the moving assembly 200 are different in structure according to different manners of the moving assembly 200 for projecting the light of the fixed contour onto the resin vat 900. For example, in an embodiment, the display screen assembly 240 can be a gate, the substrate 100 includes a light transmission port 160, a light source is located on an opposite side of the moving assembly 200 for placing the resin vat 900, the light of the light source passes through the light transmission port 160 and is then projected into the gate, the gate allows light of a preset contour to pass through, the light of the preset contour is later projected into the resin vat 900 for resin curing, the light source is generally provided in a base of a cavity structure, and the substrate 100 can be an upper top plate of the base. Alternatively, in another embodiment, the display screen assembly 240 may be an OLED (organic light emitting diode) screen, which emits light itself to display a pattern of a preset contour by controlling on/off of the organic light emitting diode, and is followed by resin curing, the substrate 100 may be of a solid plate-like structure, and the substrate 100 is still the upper top plate of the base.

Taking the direction in which the rapid prototyping device 001 is actually used as an example, the moving assembly 200 is provided directly above the substrate 100, and the suspension member 400 applies a pushing force for upward movement to the moving assembly 200, so that the moving assembly 200 is suspended above the substrate 100, and the moving assembly 200 can move toward the substrate 100 under the action of a downward external force. The pushing force of the suspension member 400 against the moving assembly 200 allows that there is a sufficient reverse acting force between an upper surface of the moving assembly 200 and the printing platform 700, such that the printing platform 700 and the upper surface of the moving assembly 200 can be fitted, and a pushing force of the suspension member 400 against the moving assembly 200 allows the resin vat 900 to be placed on the moving assembly 200 without causing movement of the moving assembly 200. Alternatively, if the pushing force of the printing platform 700 is sufficiently large and greater than the pushing force of the suspension member 400 against the moving assembly 200, the moving assembly 200 can be moved, and the gravity of the resin vat 900 is generally not greater than the pushing force of the suspension member 400 against the moving assembly 200.

The positioning assembly 300 may provide various positioning manners, may provide manual positioning, or may perform positioning by using a master controller to control a gripping structure, etc., in order to fix the relative positions of the substrate 100 and the moving assembly 200 in the leveling position, so that the moving assembly 200 does not move under the pushing force of the suspension member 400. The leveling position may be a position where it is visually observed whether the levelness of the moving assembly 200 meets a requirement when the moving assembly 200 is manually pushed to move, or the leveling position may be a position where the surface of the moving assembly 200 is fully fitted with the forming surface of the printing platform 700 when the printing platform 700 pushes the moving assembly 200 to move.

One or more positioning assemblies 300 can be provided, and a single positioning assembly 300 can achieve height adjustment and positioning of the moving assembly 200 on a single side of the moving assembly 200 to adjust the inclination angle of the moving assembly 200 or only the overall height of the moving assembly 200 relative to the substrate 100. When a plurality of positioning assemblies 300 are provided, the plurality of positioning assemblies 300 can be provided on different sides of the moving assembly 200, for example, circumferentially distributed near an edge of the moving assembly 200, to achieve height adjustment and positioning of the moving assembly 200 in a plurality of positions, so that the adjustment of the inclination angle of the moving assembly 200 is more flexible. In an embodiment that the light transmission port 160 is formed in the substrate 100 and that the moving assembly 200 includes the display screen assembly 240, the positioning assemblies 300 correspond to different sides of the display screen assembly 240. It can be understood that the positioning assemblies 300 of the present application may allow the moving assembly 200 not to move under the pushing force of the suspension member 400, but if the external pushing force is large enough, the moving assembly 200 may continue to move after the pushing force of the suspension member 400 is overcome.

The rapid prototyping device 001 according to the embodiments of the present disclosure mainly performs leveling in such a manner that the printing platform pushes the moving assembly to move relative to the substrate, and positions the moving assembly in the leveling position by means of the positioning assemblies 200, so as to avoid an unstable connection of the printing platform caused by the leveling of the printing platform. In the prior art, a leveling method is mainly used for leveling the printing platform so as to ensure that a forming surface of the printing platform is parallel to a light transmission screen. Since the printing platform and a lifting frame structure are movably connected and the connection is unstable, the printing platform is likely to be loosen during printing and to cause position displacement of the printing platform due to an external force. Compared with the prior art, in the present application, the moving assembly 200 is configured to place a resin vat 900 thereon, the plurality of positioning assemblies are arranged between the moving assembly and the substrate, and the moving assembly is pushed to move relative to the substrate by the printing platform and is positioned by the plurality of positioning assemblies 300, so that an inclination angle and height of the moving assembly can be adjusted, and the parallelism between the release film of the resin vat 900 and the printing platform can then be adjusted to ensure thickness uniformness of a first layer of a printing model and accurate forming of the model.

In an embodiment, the positioning assembly 300 is connected to the moving assembly 200, and the positioning assembly 300 is movable relative to the substrate 100 to interact with the substrate 100, positioning the moving assembly 200 in the leveling position. Alternatively, the positioning assembly 300 is connected to the substrate 100, and the positioning assembly 300 is movable relative to the moving assembly 200 to interact with the moving assembly 200, positioning the moving assembly 200 in the leveling position.

Positioning the moving assembly 200 in the leveling position means that the moving assembly 200 cannot move under the pushing force of the suspension member 400. The positioning assembly 300 can be always connected to the moving assembly 200, when the moving assembly 200 is pushed by an external force to move relative to the substrate 100, the positioning assembly 300 is disengaged from the substrate 100, and when the moving assembly 200 moves to the leveling position, the positioning assembly 300 moves relative to the substrate 100 to be re-connected to the substrate 100, such as in an abutting or snapping manner, so that the moving assembly 200 is positioned. Alternatively, the positioning assembly 300 is always connected to the substrate 100, the positioning assembly 300 is disengaged from the moving assembly 200 during leveling, so that the moving assembly 200 can move relative to the substrate 100, and when the moving assembly 200 moves to the leveling position, the positioning assembly 300 moves relative to the moving assembly 200 to be re-connected to the moving assembly 200, for example, connected to the moving assembly 200 in a clamping manner, etc., so that the moving assembly 200 is positioned.

Figure 12:
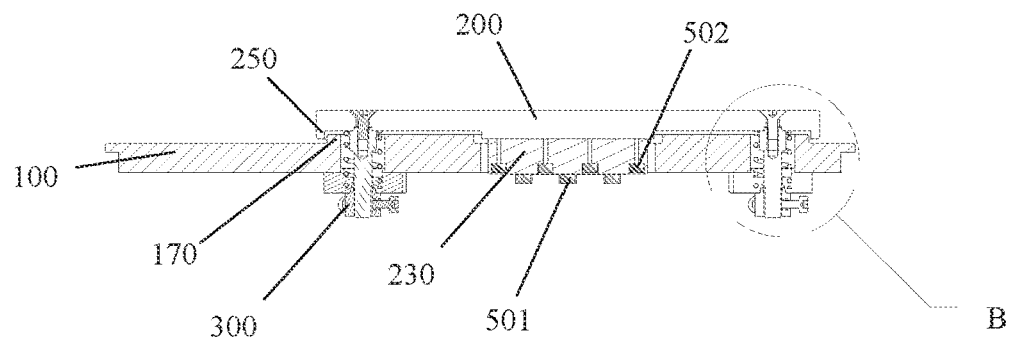
FIG. 12 is a cross-sectional view of the rapid prototyping device of FIG. 11 taken along line A-A.
Figure 13:
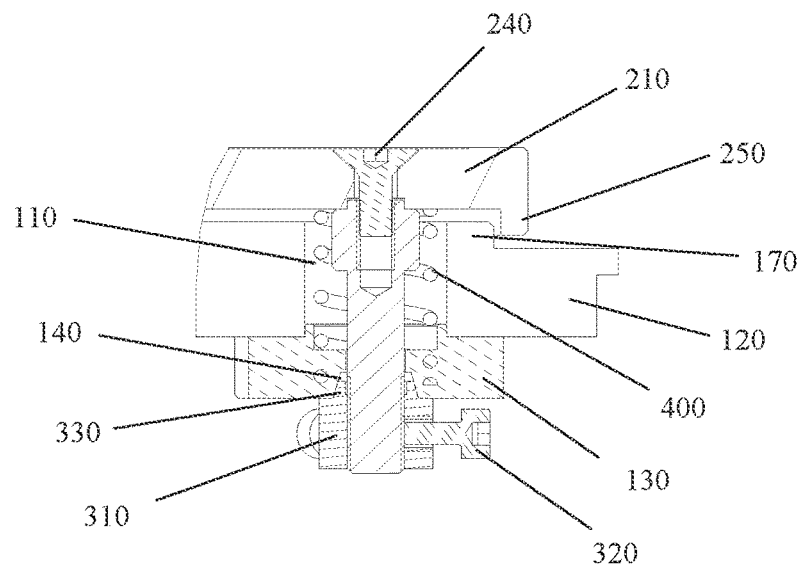
FIG. 13 is an enlarged view of region B in the schematic cross-sectional view of the rapid prototyping device of FIG. 12 taken along line A-A.
Figure 14:
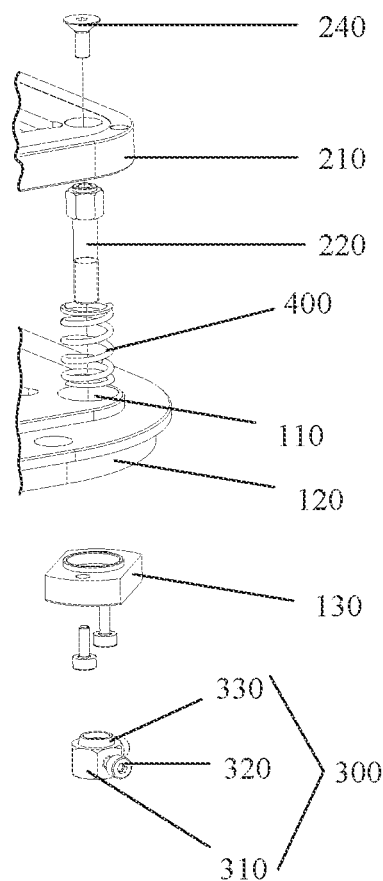
FIG. 14 is a schematic enlarged partial view of the rapid prototyping device shown in FIG. 3.

The substrate 100 and the moving assembly 200 may be directly movably connected, or the substrate 100 and the moving assembly 200 may be indirectly connected by means of the suspension member 400, and the moving assembly 200 is movably suspended on a first side of the substrate 100, so that the moving assembly 200 may be adjusted in height at either end, and the adjustment of the inclination angle of the moving assembly 200 is more flexible. As shown in FIGS. 12-14, taking a specific structure as an example, the indirect connection between the substrate 100 and the moving assembly 200 by means of the suspension member 400 is described:

The suspension member 400 is located between the substrate 100 and the moving assembly 200, the moving assembly 200 further includes a moving frame 210 and at least one guide rod 220, the moving frame 210 includes a light transmission hole 211, and the display screen assembly 240 is connected to the moving frame 210 and covers the light transmission hole 211. The substrate 100 is provided with at least one first movement hole 110 therein, the guide rods 220, the first movement holes 110 and the positioning assemblies 300 are in one-to-one correspondence, and the guide rods 220 are movably connected to the first movement holes 110 in a penetrating manner; a first end of the guide rod 220 and a second end of the guide rod 220 are respectively located at two opposite sides of the substrate 100, and the first end of the guide rod 220 is connected to the moving frame 210; and when the positioning assembly 300 extending out of the substrate 100 at the second end of the guide rod 220 reaches a required length, the positioning assembly 300 is fixedly connected to the second end of the guide rod 220, and the positioning assembly 300 abuts against the substrate 100 so as to limit the moving frame 210 from moving away from the substrate 100.

Taking the direction in which a stereo-lithography apparatus is actually used as an example, the moving frame 210 is provided directly above the substrate 100, and the suspension member 400 exerts a pushing force for upward movement between the moving assembly 200 and the substrate 100, so that the moving frame 210 is suspended above the substrate 100. The guide rod 220 extends vertically downward, and the guide rod 220 may slidably abut against or be spaced apart from a hole wall of the first movement hole 110 by a gap, such as 0.1 mm. When the moving frame 210 is pushed by the printing platform 700, the guide rod 220 moves within the first movement hole 110, so that the length of the second end of the guide rod 220 extending out of the first movement hole 110 changes. If the moving frame 210 moves close to the substrate 100 under the action of the printing platform 700, the guide rod 220 correspondingly moves downward, a region where the second end of the guide rod 220 extends out below the first movement hole 110 is lengthened, and when the positioning assembly 300 is always connected to the guide rod 220, the positioning assembly 300 escapes from an abutting relationship with a bottom surface of the substrate 100. When it is determined that the second end of the guide rod 220 extending out of the substrate 100 reaches the required length, it is ensured that there is a sufficient length for connecting the positioning assembly 300, and when the moving frame 210 is in surface contact with the printing platform 700, before the external force is not released, the positioning assembly 300 is moved or the positioning assembly 300 is mounted, so that the positioning assembly 300 rises until the positioning assembly 300 abuts against a lower surface of the substrate 100, the external force can then be released, such as driving the printing platform 700 to move upward, and a pressure of the positioning assembly 300 abutting against the substrate 100 is balanced with the pushing force of the suspension member 400 against the moving frame 210, keeping the position of the positioning assembly 300 unchanged and achieving the purpose of leveling. The guide rods 220 are provided at the different sides of the display screen assembly 240, for example, may be provided at positions of the moving frame 210 close to four corners, so as to adjust the height of the moving frame 210 at different positions and change the inclination angle of the moving frame 210.

The connection manner of the moving frame 210 and the guide rod 220 can be integral forming. Alternatively, the guide rod 220 is screwed to the moving frame 210. Alternatively, the moving frame 210 is provided with through holes therein, a top end of the guide rod 220 is provided with a threaded hole, and the moving assembly 200 further includes a fixing screw 240, wherein the fixing screw 240 is inserted into the through holes from a position above the through hole and screwed into the threaded hole to achieve fixation of the guide rod 220 and the moving frame 210, so that mounting is convenient, and a high machining cost caused by a complicated structure of the moving assembly 200 is avoided.

The positioning assembly 300 may be controlled to move relative to the guide rod 220 by a controller, a nut is connected by using an electric motor, the nut is screwed with the guide rod 220, a touch sensor is provided at a position of the substrate 100 relative to the nut, and the nut is driven to move by the electric motor until the touch sensor sends a touch signal. Alternatively, the positioning assembly 300 is moved manually. For example, in an embodiment, as shown in FIGS. 12 and 13, the positioning assembly 300 includes a first limiting block 310. The guide rod 220 includes an external thread, the first limiting block 310 includes a threaded hole matching the external thread, the first limiting block 310 is threadedly connected to the guide rod 220 through the threaded hole, and the first limiting block 310 is configured to rotate relative to the guide rod 220 so as to abut against the substrate 100.

The first limiting block 310 is of an approximately cylindrical structure, and the first limiting block 310 can get close to the substrate 100 by screwing the first limiting block 310. The first limiting block 310 can be screwed with a torque wrench/an electric torque wrench, and the torque wrench is sleeved on the first limiting block 310 to screw the first limiting block 310; and when a screwing torque reaches a set torque, a force is automatically released, so that slipping occurs between the first limiting block 310 and the torque wrench, no excessive force phenomenon occurs, the first limiting block 310 is screwed to abut against the substrate 100, and the guide rod 220 is not further pulled, ensuring that the height and inclination angle of the moving frame 210 are accurate.

Further, the positioning assembly 300 further includes at least one locking member 320, wherein the locking member 320 is movably connected to the first limiting block 310, and the locking member 320 includes a locking position where the locking member 320 is connected to the guide rod 220 so as to fix the relative positions of the first limiting block 310 and the guide rod 220, and an open position where the locking member 320 is disengaged from the guide rod 220 so as to rotate the first limiting block 310 relative to the guide rod 220.

A plurality of the locking members 320 may be provided, such as two, and the plurality of locking members 320 are distributed in a circumferential direction of the first limiting block 310. The locking member 320 may be a bolt, the first limiting block 310 includes a locking screw hole, and the locking screw hole runs through an outer wall and an inner wall of the first limiting block 310. The locking member 320 penetrates the locking screw hole and is threadedly connected to the locking screw hole. The locking member 320 may get close to or away from a side wall of the guide rod 220 by screwing the locking member 320. After the first limiting block 310 is adjusted to abut against the substrate 100, the locking member 320 is screwed close to the guide rod 220 until the locking member 320 presses against the side wall of the guide rod 220, and displacement between the first limiting block 310 and the guide rod 220 can be avoided. When the position of the first limiting block 310 needs to be adjusted again, the locking member 320 is screwed away from the guide rod 220, and the locking member 320 is disengaged from the side wall of the guide rod 220 to unfix the relative positions of the first limiting block 310 and the guide rod 220.

The suspension member 400 may be in various forms, for example, in an embodiment, the suspension member 400 is an elastic member arranged between the substrate 100 and the moving frame 210.

Two ends of the elastic member can abut against an upper surface of the substrate 100 and a lower surface of the moving frame 210 respectively. Alternatively, as shown in FIG. 13, the suspension member 400 is an elastic member, the substrate 100 includes a substrate body 120 and at least one second limiting block 130, the second limiting blocks 130 correspond to the positioning assemblies 300 in a one-to-one manner, and the second limiting blocks 130 are connected to the substrate body 120; the first movement hole 110 includes a first sub-hole formed in the substrate body 120 and a second sub-hole formed in the second limiting block 130, the first sub-hole is opposite to the second sub-hole, the guide rod 220 is movably connected to the first sub-hole and the second sub-hole in a penetrating manner, an inner diameter of the second sub-hole is smaller than an inner diameter of the first sub-hole, and the inner diameter of the second sub-hole is smaller than an outer diameter of the first limiting block 310; and the first limiting block 310 is configured to abut against the second limiting block 130, and the elastic member is located between the second limiting block 130 and the moving frame 210 and is at least partially located in the first sub-hole.

The second limiting blocks 130 may be integrally formed with the substrate body 120 or may be connected to the substrate body 120 with bolts. There is a spacing between an outer wall of the guide rod 220 and an inner wall of the first sub-hole to accommodate the elastic member. The outer wall of the guide rod 220 slidably abuts against an inner wall of the second sub-hole, so that the guide rod 220 is stable in movement and is less likely to shake.

The elastic member may be a spring, a plate spring, a rubber pad, etc. For example, the spring is sleeved on the guide rod 220, and a bottom end of the spring is inserted into the first sub-hole and abuts against a top surface of the second limiting block 130, and a top end of the spring is connected to a bottom surface of the moving frame 210. Furthermore, the top surface of the second limiting block 130 opposite to the first sub-hole is provided with a spring groove, and the bottom end of the spring is embedded into the spring groove, so that the spring is stable in position and is less likely to shake and bend, and the spring always exerts an upward pushing force to the moving frame 210 rather than exerting a force in an inclined direction. The separate arrangement of the second limiting block 130 and the substrate body 120 facilitates machining of the substrate body 120, and facilitates the replacement of the spring so as to avoid a decrease in a long-term stiffness coefficient of the spring.

In another embodiment, the suspension member 400 can also magnetically suspend the moving frame 210, for example, the suspension member 400 includes two magnetic members, wherein the two magnetic members are respectively provided on the substrate 100 and the moving frame 210, the two magnetic members have a gap therebetween, and the two magnetic members magnetically repel each other.

By means of pushing forces for opposite movement generated by the two magnetically repelling magnetic members, the moving frame 210 is suspended from the substrate 100, and the gap reserved between the two magnetic members allows the moving frame 210 to be capable of moving toward the substrate 100 under the action of an external force, such as the pushing force of the printing platform 700.

In an embodiment, the positioning assembly 300 includes a first guide member 330, the substrate 100 includes a second guide member 140, the first guide member 330 is configured to cooperate with the second guide member 140 to guide movement of the positioning assembly 300.

Taking as an example where a plane direction in which the substrate 100 is located in actual use is a horizontal direction and the positioning assembly 300 includes the first limiting block 310, the first guide member 330 is specifically provided on the first limiting block 310, and the second guide member 140 is provided on the second limiting block 130 and can achieve limiting by means of abutting. On the one hand, when the first limiting block 310 is screwed, the first guide member 330 interacts with the second guide member 140, so that the position of the first limiting block 310 does not shift during the movement, and the guide rod 220 is prevented from being tilted. On the other hand, when the first guide member 330 and the second guide member 140 are moved to final positions, it is ensured that the moving frame 210 only moves in a vertical direction relative to the substrate 100 without horizontal movement, and it is ensured that the moving frame 210 is stable in position without displacement in a horizontal direction.

In an embodiment, one of the first guide member 330 and the second guide member 140 is a protrusion and the other is a groove, both of the protrusion and the groove extend in a direction perpendicular to the substrate 100, and the protrusion is configured to be slidingly inserted into the groove.

As shown in FIG. 13, the first guide member 330 is a conical protrusion provided on the first limiting block 310, the conical protrusion surrounds the threaded hole a circle, the second guide member 140 is a conical groove formed in the second limiting block 130, and the conical groove surrounds the second sub-hole a circle. When the first limiting block 310 is screwed, the conical protrusion slides into the conical groove under the interaction of the conical protrusion and an inner wall of the conical groove, and the conical groove plays a guiding effect on the movement of the first limiting block 310. The movement of the first guide member 330 and the second guide member 140 to the final positions means that the conical protrusion of the first limiting block 310 is completely embedded into the conical groove of the second limiting block 130, an outer wall of the conical protrusion completely abuts against the inner wall of the conical groove, and a top surface of the first limiting block 310 on an outer side of the conical protrusion abuts against a bottom surface of the second limiting block 130 on an outer side of an opening of the conical groove, so as to limit the moving frame 210 in the horizontal and vertical directions by means of the guide rod 220. Also, compared with limiting the guide rod 220 only through the second sub-hole, since the first limiting block 310 has a longer contact area with the guide rod 220 in an axial direction of the guide rod 220, the fixing of the guide rod 220 by the first limiting block 310 is more stable. The groove specifically has a cross-sectional area gradually decreasing in a direction close to the bottom of the groove, and the protrusion matches the groove so that the protrusion can be quickly disengaged from the groove by being moved a small distance in the vertical direction relative to the groove, so as to avoid a large pressing resistance of the printing platform 700 caused by a large friction force between the protrusion and the groove.

Figure 6:
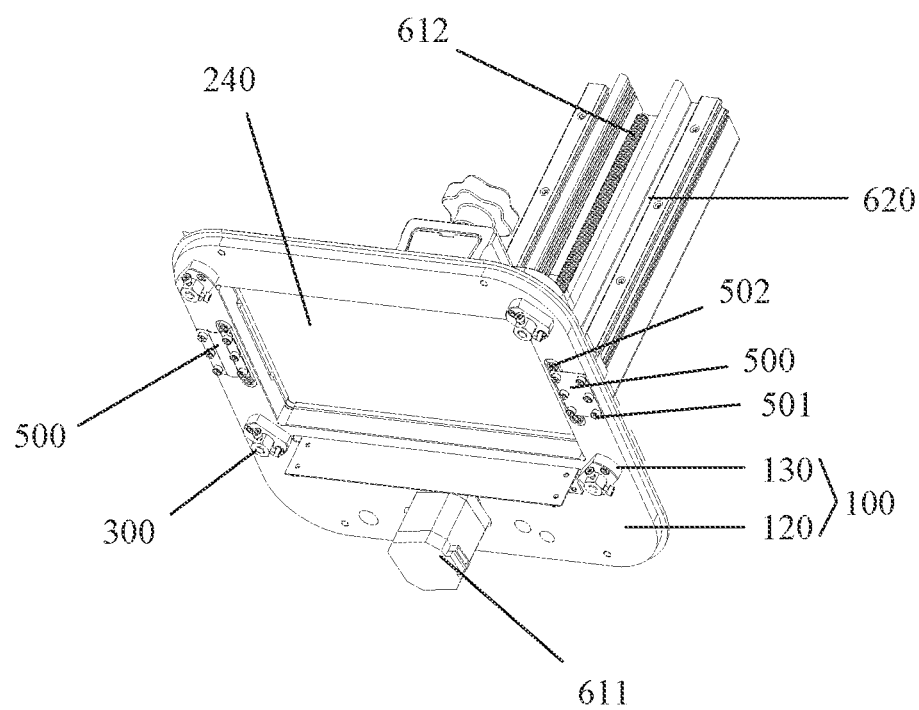
FIG. 6 is a schematic perspective view of a rapid prototyping device at a fourth perspective when a printing platform in a first position according to an embodiment of the present invention.
Figure 7:
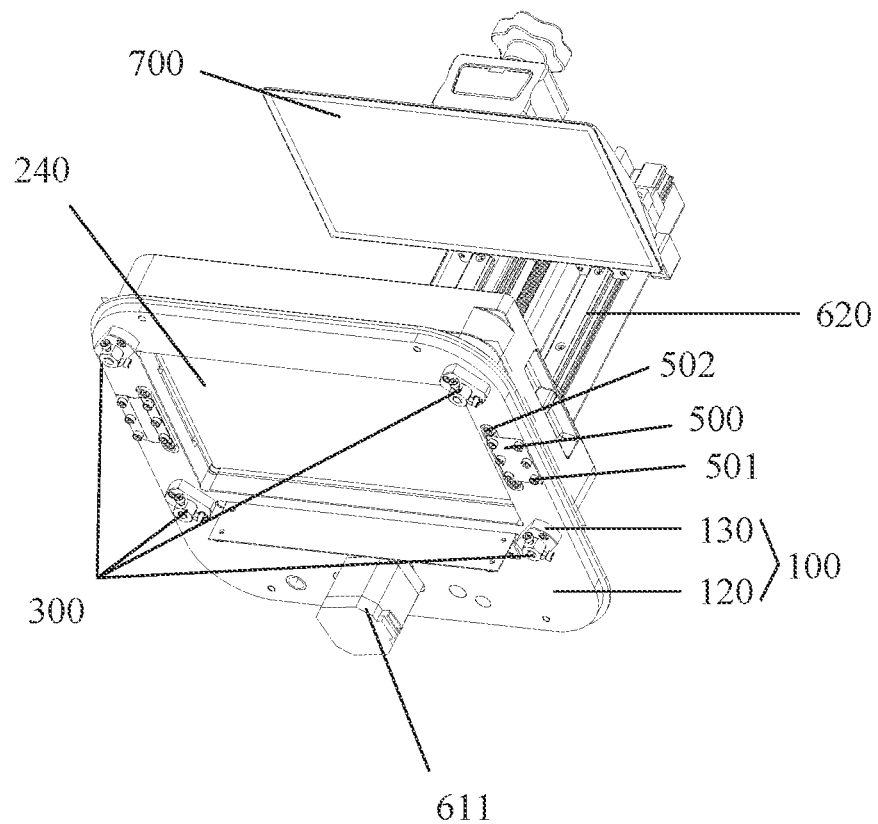
FIG. 7 is a schematic perspective view of a rapid prototyping device at a fourth perspective when a printing platform in a second position according to an embodiment of the present invention.
Figure 15:
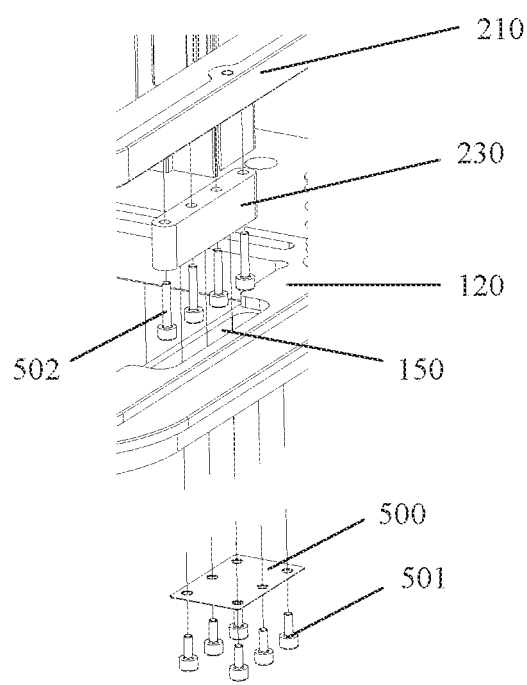
FIG. 15 is a schematic enlarged partial view of the rapid prototyping device shown in FIG. 2.

In an embodiment, in order to further limit the movement of the moving frame 210 in the plane direction of the substrate 100, the shaking of the moving frame 210 in the horizontal direction is avoided, and as shown in FIGS. 6, 7 and 15, the rapid prototyping device 001 further includes at least one limiting member 500. The limiting members 500 are each connected to the substrate 100 and the moving assembly 200, the limiting members 500 may spring in a sliding direction of the printing platform 700 so that the moving assembly 200 moves in the sliding direction of the printing platform 700, and the limiting members 500 are further configured to limit the movement of the moving assembly 200 in the plane direction perpendicular to the sliding direction of the printing platform 700.

The limiting member 500 may be of a plate-like structure with a certain degree of flexibility, for example, the limiting member 500 may be a spring steel plate, a plate spring, etc. A first end and a second end of the limiting member 500 may be two opposite edges of the limiting member 500, and the two edges may move relative to each other in a direction perpendicular to the limiting member 500, or may be close to each other under the action of a large external force without opposite movements in extending directions of the edges. During mounting, the limiting member 500 is parallel to the plane direction in which the substrate 100 is located, or at a slight included angle, for example, an included angle within 15 degrees. The limiting member 500 is connected to the substrate 100 and the moving assembly 200 by means of the two opposite edges respectively, so as to limit the movement of the moving assembly 200 in the plane direction perpendicular to the sliding direction of the printing platform 700, or in the plane direction of the limiting member 500. In an embodiment, the limiting member 500 is connected to the substrate body 120 and the moving frame 210 by means of the two opposite edges respectively.

In an embodiment, as shown in FIGS. 12 and 15, the moving assembly 200 includes a moving frame 210 and at least one moving block 230; at least one second movement hole 150 is formed in the substrate 100; the moving block 230, the second movement hole 150 and the limiting member 500 are in one-to-one correspondence, the moving block 230 is movably connected to the second movement hole 150 in a penetrating manner, a first end of the moving block 230 is connected to the moving frame 210, and a second end of the moving block 230 is connected to a second end of the limiting members 500; and a first end of the limiting members 500 are connected to the substrate 100.

The number of the second movement hole 150, the number of the limiting member 500, and the number of the moving block 230 may all be plural, such as two, and the two second movement holes 150 are respectively provided close to the two opposite side edges of the substrate body 120. The moving block 230 is inserted into the second movement hole 150, and there is a gap between an outer wall of the moving block 230 and an inner wall of the second movement hole 150, so that the moving block 230 can flexibly move within the second movement hole 150. In order to increase the length of a connection region between the moving block 230 and the limiting member 500 and ensure a limiting effect, the second movement hole 150 and the moving block 230 are both formed in a strip shape. The moving block 230 and the moving frame 210 may be integrally formed, or a plurality of first connecting bolts 502, such as four first connecting bolts 502, may also be provided, and the four first connecting bolts 502 are arranged in a length direction of the moving block 230 and fix the moving block 230 on the moving frame 210. The limiting member 500 may be fixed by providing second connecting bolts 501, the number of the second connecting bolts 501 is six, wherein three second connecting bolts 501 fix the first end of the limiting member 500 to the substrate body 120, and the other three second connecting bolts 501 fix the second end of the limiting member 500 to a bottom end of the moving block 230.

In an embodiment, the substrate 100 is provided with the light transmission port 160, the moving assembly 200 further includes the moving frame 210, the moving frame 210 includes the light transmission hole 211, the display screen assembly 240 is connected to the moving frame 210 and covers the light transmission hole 211, and the light transmission port 160 is opposite to the display screen assembly 240. The number of positioning assemblies 300 is at least two, and the at least two positioning assemblies 300 correspond to different sides of the display screen assembly 240.

The number of the positioning assemblies 300 may be four, and the number of the guide rods 220, the number of the first movement hole 110 and the number of the positioning assembly 300 are also correspondingly four. The guide rods 220 are respectively provided at four corners of the moving frame 210 on an outer side of the display screen assembly 240 to cooperate with the positioning assemblies 300, and the height and inclination angle of the display screen assembly 240 are respectively adjusted from the four corners. The number of the moving block 230, the number of the second movement hole 150 and the number of the limiting member 500 are all two, and the moving blocks 230 are respectively provided on the moving frame 210 at two opposite outer sides of the display screen assembly 240 and cooperate with the limiting members 500 to limit the moving direction of the moving frame 210 from two sides respectively.

Figure 3:
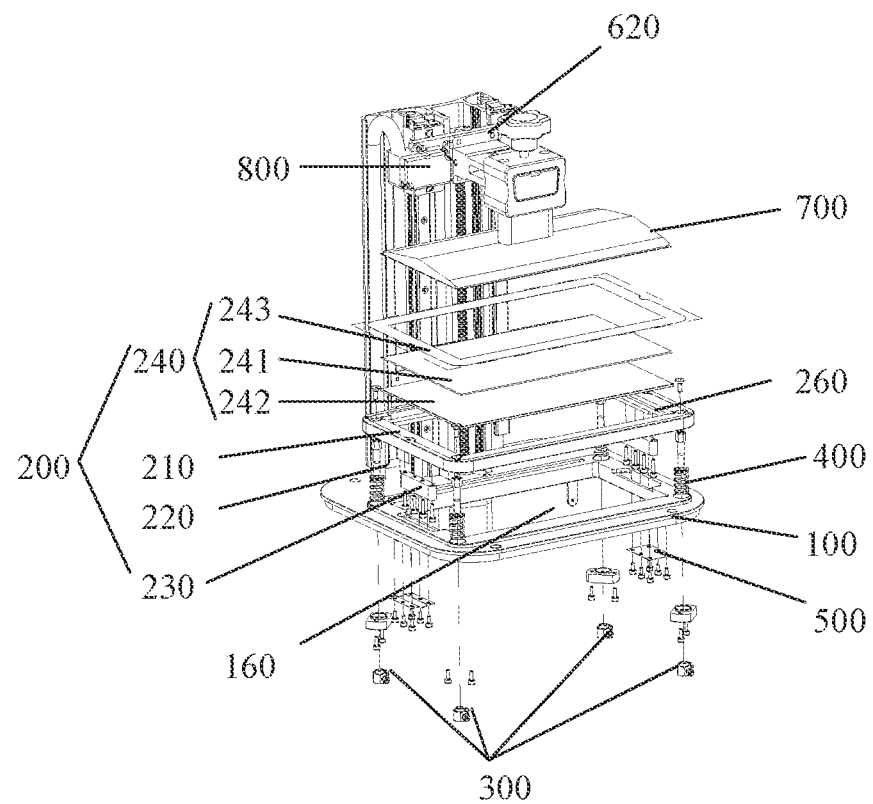
FIG. 3 is a schematic exploded view of a first partial structure of a rapid prototyping device according to an embodiment of the present invention at a second perspective.
Figure 4:
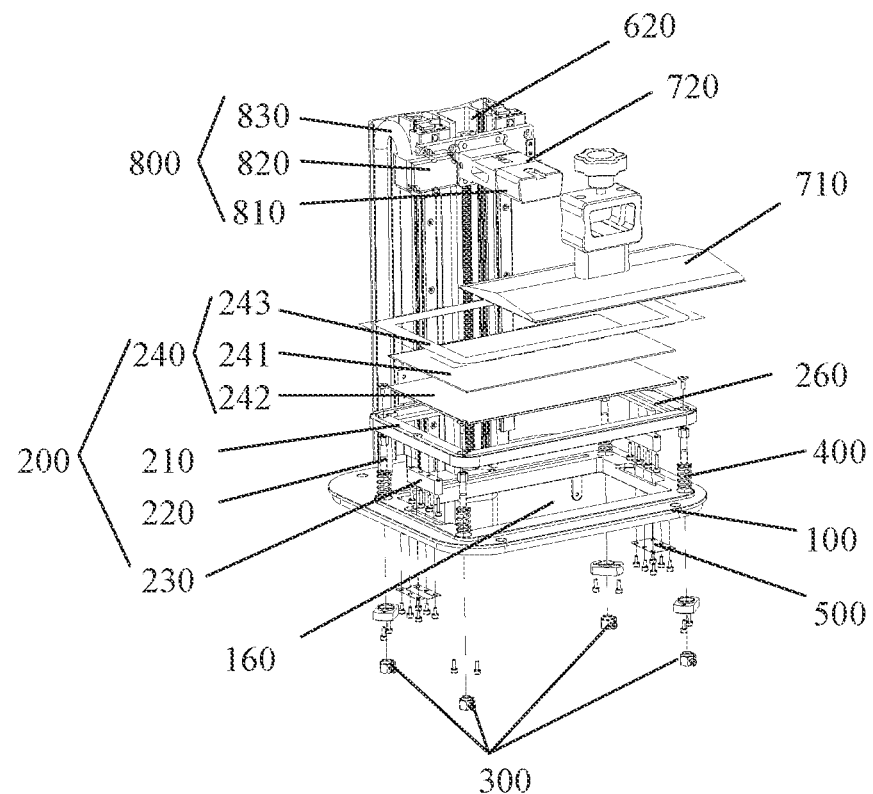
FIG. 4 is a schematic exploded view of a second partial structure of a rapid prototyping device according to an embodiment of the present invention at a second perspective.
Figure 5:
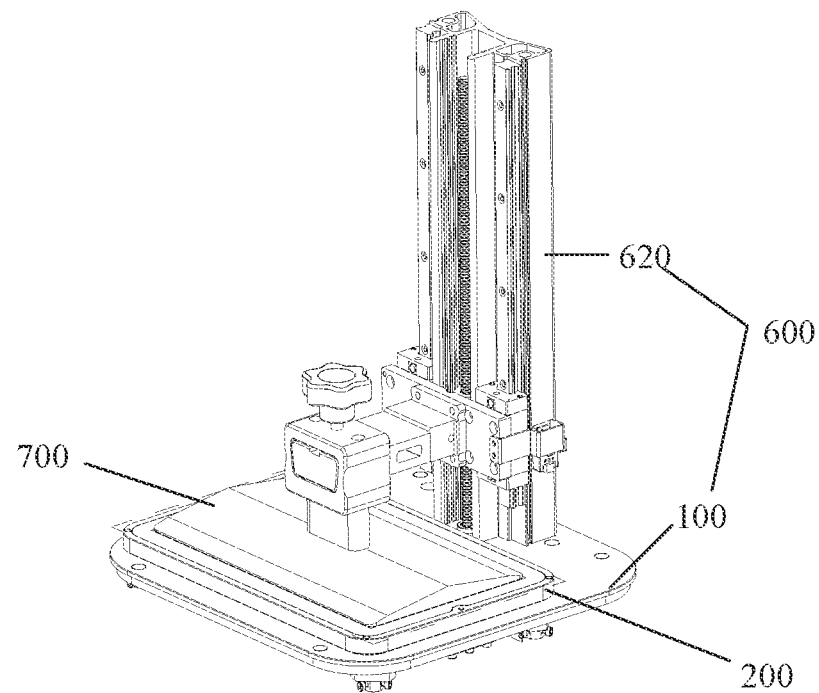
FIG. 5 is a schematic perspective view of a rapid prototyping device according to an embodiment of the present invention at a third perspective.

In an embodiment, as shown in FIGS. 3 and 4, the moving frame 210 is provided with a mounting recess 260, the light transmission hole 211 is formed in the bottom of the mounting recess 260, and the display screen assembly 240 is embedded into the mounting recess 260. The upper surface of the display screen assembly 240 is flush with an opening of the mounting recess 260, or the upper surface of the display screen assembly 240 is lower than the opening of the mounting recess 260.

The display screen assembly 240 includes an exposure screen 241, a base plate 242, and a fixing bar 243. The exposure screen 241 is laminated with the base plate 242, the base plate 242 is located between the exposure screen 241 and the bottom of the mounting recess 260, and the fixing bar 243 is connected to an edge of the exposure screen 241 and the moving frame 210 so as to fix the exposure screen 241.

The size of the light transmission hole 211 is smaller than the size of the bottom of the mounting recess 260. The base plate 242 matches an outer contour of the exposure screen 241 or the outer contour of the base plate 242 is greater than the exposure screen 241, and the base plate 242 plays the effect of supporting the exposure screen 241. The base plate 242 is embedded into the mounting recess 260, and an edge of the base plate 242 abuts against a recess wall of the mounting recess 260, so as to ensure that the base plate 242 and the exposure screen 241 are stable in position. The fixing bar 243 may specifically be a sticker, which circumferentially covers and is attached to a position where the exposure screen 241 and the mounting recess 260 are linked, to fix the exposure screen 241.

The upper surface of the display screen assembly 240 may be flush with the opening of the mounting recess 260, and the printing platform 700 pushes the moving assembly 200 to move so as to be in contact with only the display screen assembly 240, or to be in contact with the display screen assembly 240 and the upper surface of the moving frame 210 on an outer side of the mounting recess 260, so that the upper surface of the display screen assembly 240 is in surface contact with the printing platform 700 to achieve leveling. Alternatively, the upper surface of the display screen assembly 240 is lower than the opening of the mounting recess 260, and the printing platform 700 pushes the moving assembly 200 to move so as to be in contact with only the display screen assembly 240, or to be in contact with only the upper surface of the moving frame 210 on the outer side of the mounting recess 260, and the upper surface of the moving frame 210 on an outer peripheral side of the mounting recess 260 is in surface contact with the printing platform 700, namely, the leveling position of the moving assembly 200.

In an embodiment, as shown in FIGS. 12 and 13, the moving frame 210 is provided with a sealing plate 250 thereon, the sealing plate 250 is provided on at least one side edge of the moving frame 210, the sealing plate 250 extends toward the substrate 100, the substrate 100 is further provided with a boss 170 thereon, a light transmission port 160 is formed on the boss 170, and the sealing plate 250 is located at an outer periphery of the boss 170.

The sealing plate 250 may surround the edge of the moving frame 210 a circle and extend in a vertical direction, the sealing plate 250 surrounds the outer periphery of the boss 170, and there is a gap between the boss 170 and the sealing plate 250, for example, a spacing of 1-5 mm, ensuring that the boss 170 and the sealing plate 250 do not bump against each other and ensuring that the moving frame 210 moves up and down smoothly. The sealing plate 250 surrounds the outer periphery of the boss 170, so that non-contact sealing can be achieved, and resin can be prevented from flowing between the moving assembly 200 and the substrate 100 and from being attached to the suspension member 400 and other structures, and thus leveling cannot be performed. In addition, the resin is prevented from flowing into a base of the stereo-lithography apparatus through the light transmission port 160 and from being in contact with electronic control devices such as a master controller.

In some other embodiments, a seal ring is arranged between the substrate 100 and the moving frame 210, and the seal ring surrounds the sealing plate 250 to shorten a distance between the substrate 100 and the moving frame 210 and to further avoid leakage of the resin.

In an embodiment, as shown in FIGS. 1-11, the stereo-lithography apparatus further includes: a driving mechanism 610, the frame further including a base and a guide frame 620, wherein the substrate 100 is connected to the base, the guide frame 620 is connected to at least one of the base and the substrate 100, the printing platform 700 is connected to the guide frame 620, and the driving mechanism 610 is connected to the printing platform 700; and a pressure monitoring device 800, wherein the pressure monitoring device 800 is provided on at least one of the guide frame 620 and the printing platform 700. The guide frame 620 is configured to drive the printing platform 700 to move along the guide frame 620 in a direction close to or away from the moving assembly 200, the printing platform 700 is configured to push the moving assembly 200 to move relative to the substrate 100, the pressure monitoring device 800 is configured to detect a pressure value of the printing platform 700 and generate a feedback signal if the pressure value is greater than or equal to a preset pressure threshold, and the leveling position is a position where the pressure monitoring device 800 generates the feedback signal.

The base may be a cavity structure with a top opening, and the substrate 100 may be an upper top plate of the base. The guide frame 620 may be provided on the substrate 100, and the printing platform 700 is opposite to the moving assembly 200, that is, the printing platform is opposite to the display screen assembly 240 of the moving assembly 200. During leveling, the positioning assembly 300 is adjusted to be in a non-fixed state such that the moving assembly 200 moves relative to the substrate 100. In an embodiment where the positioning assembly 300 includes the first limiting block 310 and the locking member 320, the limiting member 320 may be first adjusted to an open position. The master controller drives the printing platform 700 to move downward by means of the driving mechanism 610 so as to push the moving assembly 200 to move relative to the substrate 100, the moving assembly 200 exerts an opposite acting force to the printing platform 700, namely, the moving assembly 200 exerts a pressure to the printing platform 700, and the pressure monitoring device 800 can detect a pressure value for the printing platform 700 and transmit same to the master controller. When the printing platform 700 is in contact with the moving assembly 200, the pressure monitoring device 800 detects one pressure value and determines that the printing platform 700 is zeroed. In this case, since the forming surface of the printing platform 700 is not parallel to the upper surface of the moving assembly 200, the printing platform 700 may only have an apex or an edge that abuts against the moving assembly 200. After the printing platform 700 is zeroed, the master controller continues to drive the printing platform 700 to move downward by means of the driving mechanism 610, and the apex or the edge of the printing platform 700 in contact with the moving assembly 200 pushes a corner or a side of the moving assembly 200 to move, so that the height of the corner or the side of the moving assembly 200 changes, and the surface of the moving assembly 200 is then gradually parallel to the forming surface of the printing platform 700 until when the surface of the moving assembly 200 is completely fitted with the forming surface of the printing platform 700, the continued downward movement of the moving assembly 200 applies a larger pressure value to the printing platform 700. When the pressure value is greater than or equal to the preset pressure threshold, it is proved that the leveling is completed, and a feedback signal is sent to the master controller, and in this case, the position of the moving assembly 200 is the leveling position. Each first limiting block 310 is screwed sequentially until the first limiting block 310 abuts against the substrate 100, and the locking member 320 is then moved to a locking position, namely, the position of the moving assembly 200 is fixed, and the leveling finishes. The master controller drives the printing platform 700 to move upward by means of the driving mechanism 610, and the resin vat 900 is placed on the moving assembly 200 and is attached to the upper surface of the exposure screen 241 so as to perform stereo lithography.

Figure 8:
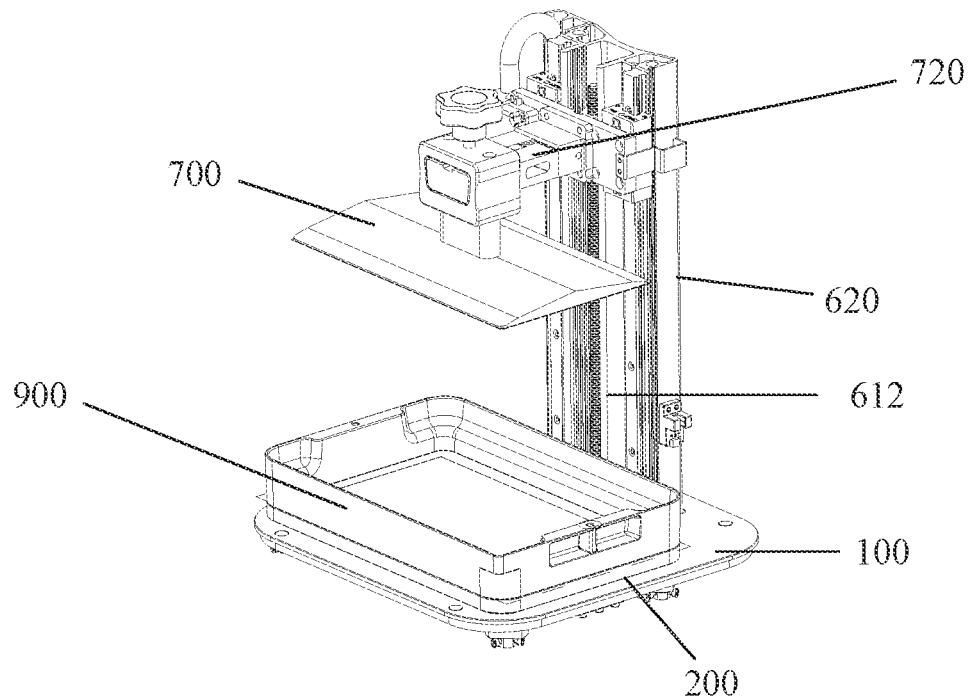
FIG. 8 is a schematic perspective view of a rapid prototyping device according to an embodiment of the present invention at a fifth perspective.
Figure 9:
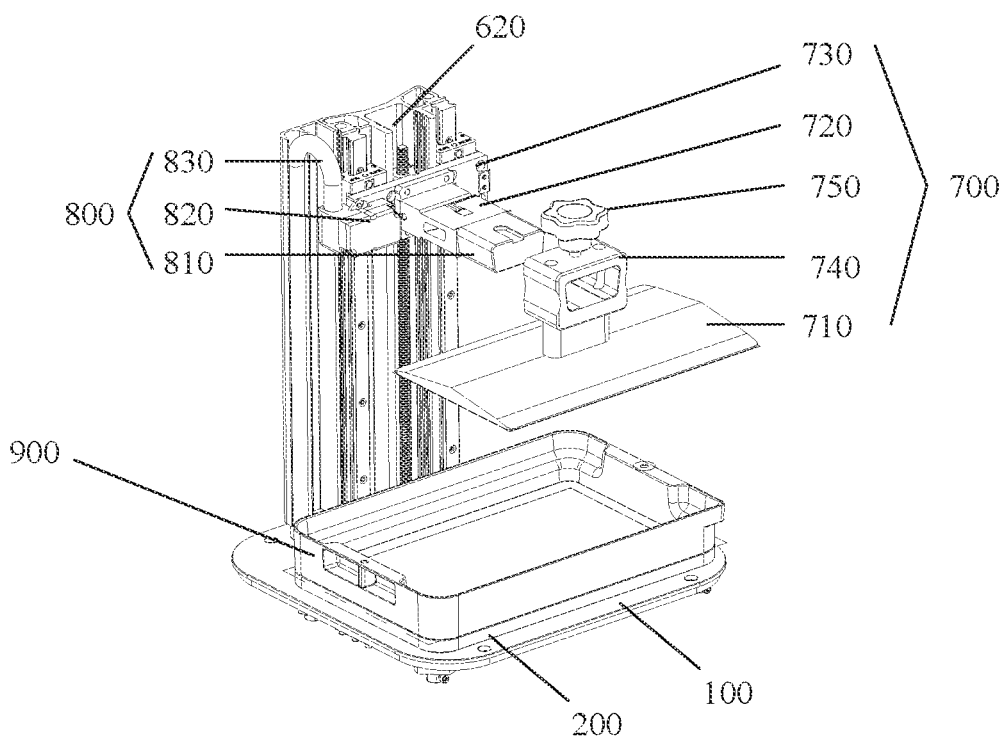
FIG. 9 is a schematic perspective view of a rapid prototyping device according to an embodiment of the present invention at a sixth perspective.
Figure 10:
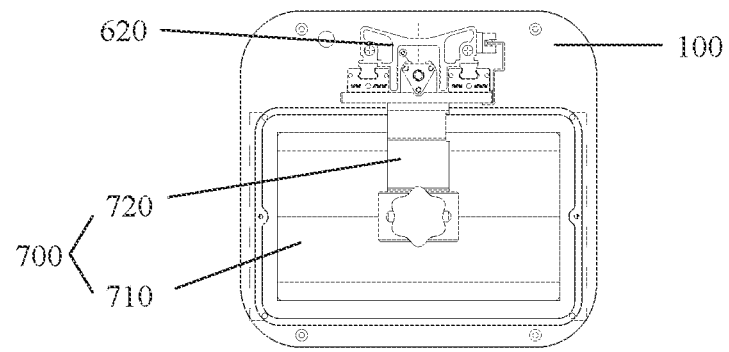
FIG. 10 is a schematic perspective view of a rapid prototyping device according to an embodiment of the present invention at a seventh perspective.
Figure 11:
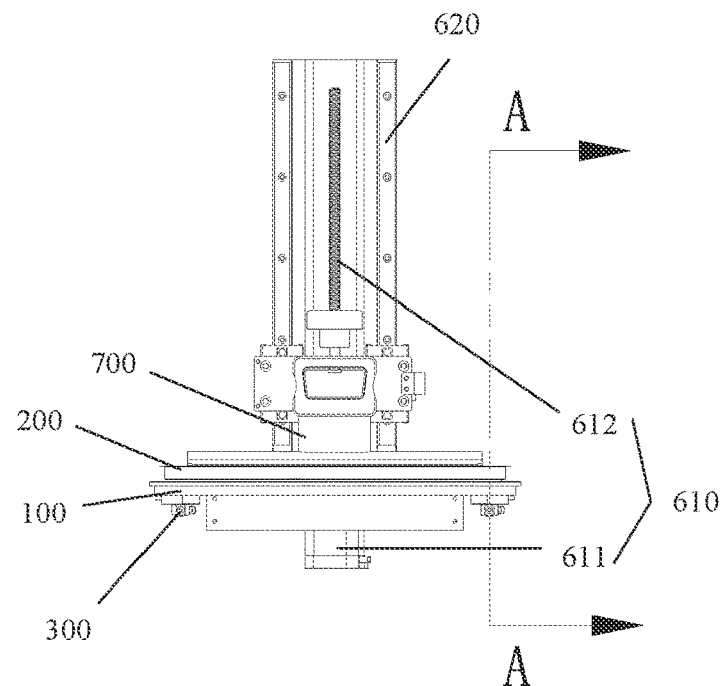
FIG. 11 is a schematic perspective view of a rapid prototyping device according to an embodiment of the present invention at an eighth perspective.

The pressure monitoring device 800 may be a variety of electrical devices configured to detect the pressure of the printing platform 700. For example, in an embodiment, as shown in FIGS. 3, 8 and 9, the pressure monitoring device 800 includes a strain gauge sensor 810 and a processor. The printing platform 700 includes a model support 710 and a cantilever 720, wherein a first end of the cantilever 720 is slidably connected to the guide frame 620, a second end of the cantilever 720 extends away from the guide frame 620, the driving mechanism 610 is connected to the cantilever 720, the printing platform 700 is connected to the second end of the cantilever 720, and the processor is electrically connected to the strain gauge sensor 810. The strain gauge sensor 810 is provided on the cantilever 720, the strain gauge sensor 810 is configured to be forced to deform when the model support 710 pushes the moving assembly 200, so as to detect a pressure value of the model support 710, and the processor is configured to compare the pressure value with a preset pressure threshold, and to generate a feedback signal if the pressure value is greater than or equal to the preset pressure threshold.

The driving mechanism 610 may specifically include a driving member 611 and a lead screw 612, the printing platform 700 further includes a sliding block 730, one end of the guide frame 620 is connected to the substrate 100 and extends in a direction perpendicular to the substrate 100, and the driving member 611 is provided on the side of the substrate 100 opposite to the guide frame 620, namely, the driving member 611 is located in the base; a rotating shaft of the driving member 611 passes through the substrate 100 and is connected to the lead screw 612; and the lead screw 612 extends in the same direction as the guide frame 620. The sliding block 730 is connected to the guide frame 620 and can slide along a sliding rail of the guide frame 620, and the lead screw 612 is screwed to the sliding block 730. One end of the cantilever 720 is connected to the sliding block 730, and the other end extends away from the sliding block 730 and is suspended. The strain gauge sensor 810 is an elastic strain gauge attached to the surface of the cantilever 720 close to the other end. In an embodiment, the printing platform 700 further includes a connecting frame 740 and a hexagonal handle 750, the model support 710 is configured to be in contact with the moving assembly 200, and the connecting frame 740 is configured to be sleeved on a suspended end of the cantilever 720 and outside the strain gauge sensor 810, so that the strain gauge sensor 810 can more directly and efficiently detect the pressure to which the platform body is subjected. A snap-in groove is formed in the cantilever 720, and the hexagonal handle 750 penetrates the connecting frame 740 and is then embedded into and abuts against the snap-in groove, so that the connecting frame 740 is fixed to the cantilever 720. The processor is electrically connected to the strain gauge sensor 810 and to the master controller of the rapid prototyping device 001. The processor may be an amplifier for amplifying a pressure signal of the strain gauge sensor 810, or may further compare the pressure signal of the strain gauge sensor 810 with a preset pressure threshold, and output a feedback signal if the pressure signal is greater than or equal to the preset pressure threshold.

It may be understood that associated parts of the foregoing embodiments may be mutually referenced or crossed, so that from the point of view of those of ordinary skill in the art, some new embodiments can be formed through combination, and these embodiments are still within the scope of protection of the present disclosure.

The foregoing description merely relates to the specific embodiments of the present disclosure, but the scope of protection of the present disclosure is not limited thereto. Any changes or replacements that can be easily conceived by those skilled in the art within the technical scope disclosed by the present disclosure shall fall within the scope of protection of the present disclosure. Therefore, the scope of protection of the present disclosure shall be subject to the scope of protection of the claims.

What is claimed is:
1. A rapid prototyping device, comprising:
a frame, wherein the frame comprises a substrate;
a printing platform, wherein the printing platform is slidably connected to the frame;
a moving assembly, wherein the moving assembly is configured to move to a leveling position under pushing of the printing platform;
a suspension member, wherein the suspension member is connected with the moving assembly, and the suspension member is configured to move the moving assembly away from the substrate, to the printing platform; and
at least one positioning assembly, wherein the at least one positioning assembly is configured to lock the moving assembly in the leveling position.

2. The rapid prototyping device according to claim 1, wherein
the suspension member is located between the substrate and the moving assembly;
the moving assembly comprises a moving frame and at least one guide rod; and
the substrate is provided with at least one first movement hole;
wherein the at least one guide rod is penetrated through the at least one first movement hole; a first end of the at least one guide rod and a second end of the at least one guide rod are respectively located at two opposite sides of the substrate, the first end of the at least one guide rod is connected to the moving frame, the at least one positioning assembly is configured to fixedly connect to the second end of the at least one guide rod, and abut against the substrate to limit the moving frame from moving away from the substrate.

3. The rapid prototyping device according to claim 2, wherein
the at least one guide rod comprises an external thread,
the at least one positioning assembly comprises a first limiting block, wherein the first limiting block comprises a threaded hole matching the external thread, the first limiting block is connected to the at least one guide rod through the threaded hole, and the first limiting block is configured to rotate relative to the at least one guide rod to abut against the substrate;
the at least one positioning assembly further comprises at least one locking member wherein the at least one locking member is connected to the first limiting block, and the at least one locking member comprises a locking position and an open position, wherein the locking position is configured to lock the at least one guide rod to fix the relative positions of the first limiting block and the at least one guide rod, the open position is configured to disengage the at least one guide rod.

4. The rapid prototyping device according to claim 2, wherein
the suspension member is an elastic member arranged between the substrate and the moving assembly.

5. The rapid prototyping device according to claim 3, wherein
the suspension member is an elastic member;
the substrate comprises a substrate body and at least one second limiting block, wherein the at least one second limiting block is connected to the substrate body;
the at least one first movement hole comprises a first sub-hole formed in the substrate body and a second sub-hole formed in the at least one second limiting block, wherein the first sub-hole is opposite to the second sub-hole, the at least one guide rod is penetrated through the first sub-hole and the second sub-hole;

the first limiting block is configured to abut against the at least one second limiting block, and the elastic member is located between the at least one second limiting block and the moving frame and is at least partially located in the first sub-hole.

6. The rapid prototyping device according to claim 2, wherein
the suspension member comprises two magnetic members, wherein the two magnetic members are respectively provided on the substrate and the moving frame, the two magnetic members forms a gap, and the two magnetic members are magnetically repelled each other.

7. The rapid prototyping device according to claim 1, wherein
the at least one positioning assembly comprises a first guide member, the substrate comprises a second guide member, and the first guide member is configured to cooperate with the second guide member to guide movement of the at least one positioning assembly;
one of the first guide member and the second guide member is a protrusion, the other one of the first guide member and the second guide member is a groove, the protrusion and the groove are extend in a direction perpendicular to the substrate, and the protrusion is configured to insert into the groove; and
the groove is in a conical shape, the groove has a cross-sectional area gradually decreasing in a direction close to the bottom of the groove.

8. The rapid prototyping device according to claim 1, wherein the rapid prototyping device further comprises:
at least one limiting member, wherein the at least one limiting member is connected to the substrate and the moving assembly, the at least one limiting member is configured to spring in a sliding direction of the printing platform so that the moving assembly is moved in the sliding direction of the printing platform, and the at least one limiting member is further configured to limit the movement of the moving assembly in a plane direction perpendicular to the sliding direction of the printing platform.

9. The rapid prototyping device according to claim 8, wherein
the moving assembly comprises a moving frame and at least one moving block, at least one second movement hole is formed in the substrate, the at least one moving block is movably connected to the at least one second movement hole in a penetrating manner, a first end of the at least one moving block is connected to the moving frame, and a second end of the at least one moving block is connected to a second end of the at least one limiting member, a first end of the at least one limiting member is connected to the substrate; and
the at least one limiting member is a spring steel plate or a plate spring.

10. The rapid prototyping device according to claim 1, wherein
the substrate is provided with a light transmission port, the moving assembly further comprises a moving frame, the moving frame comprises a light transmission hole, a display screen assembly is connected to the moving frame and is covered the light transmission hole, and the light transmission port is opposite to the display screen assembly; and
at least two positioning assemblies are correspond to different sides of the display screen assembly.

11. The rapid prototyping device according to claim 10, wherein
the moving frame is provided with a sealing plate, the sealing plate is provided on at least one side of the moving frame, the sealing plate is extended toward the substrate, the substrate is further provided with a boss, the light transmission port is formed on the boss, and the sealing plate is located at an outer periphery of the boss; and
a seal ring is arranged between the substrate and the moving frame, and the sealing plate is surrounded by the seal ring surrounds.

12. The rapid prototyping device according to claim 10, wherein
the moving frame is provided with a mounting recess, the light transmission hole is formed in the bottom of the mounting recess, and the display screen assembly is embedded into the mounting recess;
an upper surface of the display screen assembly is flush with an opening of the mounting recess, or the upper surface of the display screen assembly is lower than the opening of the mounting recess;
the display screen assembly comprises an exposure screen, a base plate and a fixing bar; and
the exposure screen is laminated with the base plate, the base plate is located between the exposure screen and the bottom of the mounting recess, and the fixing bar is connected to an edge of the exposure screen and the moving frame to fix the exposure screen.

13. The rapid prototyping device according to claim 1, wherein the rapid prototyping device further comprises:
a driving mechanism, wherein the frame further comprises a base and a guide frame, the substrate is connected to the base, the guide frame is connected to at least one of the base and the substrate, the printing platform is slidably connected to the guide frame, and the driving mechanism is connected to the printing platform; and
a pressure monitoring device, wherein the pressure monitoring device is provided on at least one of the guide frame and the printing platform; and
the driving mechanism is configured to drive the printing platform to move along the guide frame in a direction close to or away from the moving assembly, the printing platform is configured to push the moving assembly to move relative to the substrate, the pressure monitoring device is configured to detect a pressure value of the printing platform and generate a feedback signal if the pressure value is greater than or equal to a preset pressure threshold, and the leveling position is a position where the pressure monitoring device generates the feedback signal.

14. The rapid prototyping device according to claim 13, wherein
the pressure monitoring device comprises a strain gauge sensor and a processor, the printing platform comprises a model support and a cantilever, a first end of the cantilever is slidably connected to the guide frame, a second end of the cantilever extends away from the guide frame, the driving mechanism is connected to the cantilever, the model support is connected to the second end of the cantilever, and the processor is electrically connected to the strain gauge sensor; and
the strain gauge sensor is provided on the cantilever, the strain gauge sensor is configured to be forced to deform when the moving assembly is pushed by the model support to detect the pressure value of the model support, and the processor is configured to compare the pressure value with the preset pressure threshold to generate the feedback signal if the pressure value is greater than or equal to the preset pressure threshold.

* * * * *